(12) United States Patent
Lin

(10) Patent No.: US 6,548,563 B1
(45) Date of Patent: Apr. 15, 2003

(54) ENVIRONMENT FRIENDLY MATERIAL

(76) Inventor: Bo-Hon Lin, No. 311, Liu Chiau E. Road, Wapei Village, Pu Shin Hsiang, Changhu Hsien (TW)

( * ) Notice: Subject to any disclaimer, the term of this patent is extended or adjusted under 35 U.S.C. 154(b) by 0 days.

(21) Appl. No.: 10/212,205

(22) Filed: Aug. 6, 2002

(51) Int. Cl.⁷ .................................................... C08J 9/00
(52) U.S. Cl. ...................................... 521/84.1; 521/142
(58) Field of Search ................................ 521/84.1, 142

(56) References Cited

U.S. PATENT DOCUMENTS

| | | | |
|---|---|---|---|
| 4,990,541 A | * | 2/1991 | Nielsen et al. |
| 5,352,709 A | * | 10/1994 | Tarrant et al. |
| 5,437,924 A | * | 8/1995 | Decker, III et al. |
| 5,766,529 A | * | 6/1998 | Franke et al. |
| 6,406,649 B1 | * | 6/2002 | Fisk |

* cited by examiner

*Primary Examiner*—Morton Foelak
(74) *Attorney, Agent, or Firm*—Rosenberg, Klein & Lee

(57) ABSTRACT

A material that is bio-degradable includes a mixture composed of 69.8% of Polyethylene, 30% of starch and 0.2% of foaming agent. The mixture is heated and foamed in a mold or is blown by a blowing molding machine to a desired shape. The material is bio-degradable.

2 Claims, 1 Drawing Sheet

| Conventional Material / Functions | Paper | Plastic | Corn starch Plastic | Degradable Plastic | Present Invention |
|---|---|---|---|---|---|
| Less natural resources required | × | ○ | × | ○ | ○ |
| Anti-humidity Anti-fungus | × | ○ | × | ○ | ○ |
| Re-usable | × | ○ | × | × | ○ |
| No pollution during final treatment | ○ | × | △ | △ | ○ |
| Certificate for environment friendly | × | × | × | × | ○ |
| Writable | ○ | × | × | × | ○ |
| Durable | × | ○ | ○ | ○ | ○ |
| Bio-degradable | ○ | × | × | × | ○ |

FIG.1

ENVIRONMENT FRIENDLY MATERIAL

FIELD OF THE INVENTION

The present invention relates to an environment friendly material that is mixed with Polyethylene, starch and foaming agent. The material can be blown into bags or bowls and is biodegradable

BACKGROUND OF THE INVENTION

Conventional containers or bags are made of plastic which is light in weight and durable so that plastic is used in a variety of fields and brings us convenience in our daily life. However, the plastic generates toxic material when being burned so that it can only be buried in the soil. The plastic material can not be degradable in the soil and therefore increases the load of the environment. Paper-made bags are more friendly to the environment compared with the plastic, the paper-bags cannot contain liquid stuff and is easily to be torn apart. Besides, paper is made from trees which are important for balancing the weather of the earth so that the resource of trees is difficult to find.

The present invention intends to provide a new material that is made by bio-degradable elements and can be blown into different shapes of containers.

SUMMARY OF THE INVENTION

In accordance with one aspect of the present invention, there is provided a material that is biodegradable includes a mixture composed of 69.8% of Polyethylene, 30% of starch and 0.2% of foaming agent. The mixture is heated and foamed in a mold or is blown by a blowing molding machine to a desired shape. The material is bio-degradable.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 shows a chart that compares the material of the present invention and conventional materials.

DETAILED DESCRIPTION OF THE PREFERRED EMBODIMENT

The material of the present invention comprises a mixture composed of 69.8% to 40.8% of Polyethylene, 30% to 59% of starch and suitable amount of foaming agent. The mixture is heated and foamed in a mold to be product such as bowls, or even shoe soles. The material can also be blown in a blowing molding machine to be desired shapes. The mixture has a preferable proportion which includes 69.8% of Polyethylene, 30% of starch and 0.2% of foaming agent.

Referring to FIG. 1, the material has outstanding benefits when compared with conventional material, which includes less natural resources required, anti-humidity, anti-fungus, re-usable, no pollution during final treatment, certificate for environment friendly, writable, durable, and biodegradable.

While we have shown and described the embodiment in accordance with the present invention, it should be clear to those skilled in the art that further embodiments may be made without departing from the scope of the present invention.

What is claimed is:
1. A material that is bio-degradable consisting:

a mixture composed of 69.8% to 40.8% of Polyethylene, 30% to 59% of starch and 0.2% of foaming agent, the mixture being heated and foamed.

2. A material that is bio-degradable consisting:

a mixture composed of 69.8% of Polyethylene, 30% of starch and 0.2% of foaming agent, the mixture being heated and foamed.

* * * * *